United States Patent
Pan et al.

(10) Patent No.: US 6,613,237 B2
(45) Date of Patent: Sep. 2, 2003

(54) APPARATUS AND METHOD FOR REMOVING MATTER ON A FLUID SURFACE OF A TANK

(75) Inventors: Sean X. Pan, Penfield, NY (US); Peter J. Schmitt, Williamson, NY (US)

(73) Assignee: Xerox Corporation, Stanford, CT (US)

(*) Notice: Subject to any disclaimer, the term of this patent is extended or adjusted under 35 U.S.C. 154(b) by 2 days.

(21) Appl. No.: 10/043,870

(22) Filed: Jan. 14, 2002

(65) Prior Publication Data

US 2003/0132159 A1 Jul. 17, 2003

(51) Int. Cl.$^7$ ................................................. C02F 1/40
(52) U.S. Cl. ...................... 210/776; 210/172; 210/523; 210/540; 118/422; 118/429; 427/430.1
(58) Field of Search ................................. 210/776, 523, 210/525, 538, 540, 703, 172; 118/422, 429; 427/430.1

(56) References Cited

U.S. PATENT DOCUMENTS

| | | | | |
|---|---|---|---|---|
| 1,232,370 A | * | 7/1917 | Morison | 210/172 |
| 3,219,189 A | * | 11/1965 | Moore | 210/540 |
| 3,556,297 A | * | 1/1971 | Harrington | 210/540 |
| 4,418,641 A | * | 12/1983 | Nakashima et al. | 118/429 |
| 4,872,997 A | * | 10/1989 | Becker | 210/703 |
| 5,089,118 A | * | 2/1992 | Mahoney | 210/523 |
| 5,681,392 A | * | 10/1997 | Swain | 118/429 |
| 5,693,372 A | * | 12/1997 | Mistrater et al. | 427/430.1 |
| 5,948,244 A | * | 9/1999 | Fortier | 210/523 |
| 6,180,310 B1 | * | 1/2001 | Pinsly | 427/430.1 |

* cited by examiner

*Primary Examiner*—Christopher Upton
(74) *Attorney, Agent, or Firm*—Wayne J. Egan

(57) ABSTRACT

It is desired to remove matter on a fluid surface of a tank. The tank defines a circular tank orifice comprising a tank orifice rim, the tank orifice rim containing a fluid surface of a fluid, the fluid overflowing the tank orifice rim to form a fluid overflow, the fluid surface defining a fluid surface center. The matter is removed by discharging from near the tank orifice rim a plurality (n) of jets of the fluid towards the fluid surface center. Any matter on the fluid surface is thereby urged toward the tank orifice rim and eventually removed from the fluid surface by the fluid overflow. In one application, the tank comprises a dip tank and the fluid comprises photoreceptor coating solution or components thereof such as solvents, additives, or both.

30 Claims, 7 Drawing Sheets

APPARATUS AND METHOD FOR REMOVING MATTER ON A FLUID SURFACE OF A TANK

TECHNICAL FIELD OF THE INVENTION

This application relates to removing matter on a fluid surface of a tank.

BACKGROUND OF THE INVENTION

It is known to use coating fluid reservoirs or "dip tanks" to apply photoreceptor coating solution to coat photoreceptor devices such as photoreceptor flexible belts and cylindrical-shaped drums. For example, in the commonly-assigned U.S. Pat. No. 5,681,392 by Eugene A. Swain, entitled "Fluid reservoir containing panels for reducing rate of fluid flow," issued Oct. 28, 1997, the fluid reservoir (equivalent to a dip tank) 10 is used to supply organic photoreceptor coating fluid 80 to coat a flexible belt-type photoreceptor substrate 60.

In this coating process, a photoreceptor substrate (belt or drum) is immersed or "dipped" into the orifice of a tank containing the solution to be coated and then withdrawn at a rate that controls the coating thickness. The usual mechanism to coat the substrate is to pump a coating solution containing the active materials, either dissolved or in suspension (such as pigments), into the tank from an inlet located in the bottom of the dip tank and continuously overflow the tank at the orifice located at the top of the tank. In this way the substrate is subjected to a uniform flow of solution relative to the coating speed.

There are several problems in the dip coating process which can result in defects on the coated substrate surface.

In one such problem, for example, sometimes foreign matter such as bubbles or particles are introduced into the coating solution due to various causes. These foreign materials remain on the surface of the coating solution even when there is overflow from the dip tank, thereby causing problems in quality and yield, such as streaks and resist spots.

Moreover, current dip tanks provide coating solution flow that is symmetric for flow and thickness uniformity. However, such symmetry is undesired in order to remove entrained foreign matter that may be trapped in the center of the coating solution by vortices. Also, bubbles caused by dipping photoreceptor drums also tend to adhere to the surface of the drum.

As a result, there is a need for a method and an apparatus for removing matter on a fluid surface of a tank.

SUMMARY OF THE INVENTION

In one aspect of the invention, there is described a method for removing matter on a fluid surface of a tank, the tank defining a tank orifice comprising a tank orifice rim, the tank orifice rim containing a fluid surface of a fluid, the fluid overflowing the tank orifice rim to form a fluid overflow, the fluid surface defining a fluid surface center, the method comprising discharging a plurality (n) of jets of the fluid towards the fluid surface center.

In another aspect of the invention, there is described an apparatus for removing matter on a fluid surface of a tank, the tank defining a tank orifice comprising a tank orifice rim, the tank orifice rim containing a fluid surface of a fluid, the fluid overflowing the tank orifice rim to form a fluid overflow, the fluid surface defining a fluid surface center, the apparatus comprising means for discharging a plurality (n) of jets of the fluid towards the fluid surface center.

DESCRIPTION OF THE PREFERRED EMBODIMENT

Briefly, it is desired to remove matter on a fluid surface of a tank. The tank defines a tank orifice comprising a tank orifice rim, the tank orifice rim containing a fluid surface of a fluid, the fluid overflowing the tank orifice rim to form a fluid overflow, the fluid surface defining a fluid surface center. The matter is removed by discharging a plurality (n) of jets of the fluid towards the fluid surface center. Any matter on the fluid surface is thereby urged toward the tank orifice rim and eventually removed from the fluid surface by the fluid overflow. In one embodiment, the tank comprises a dip tank and the fluid comprises photoreceptor coating solution or components thereof such as solvents, additives, or both.

Figure 1:
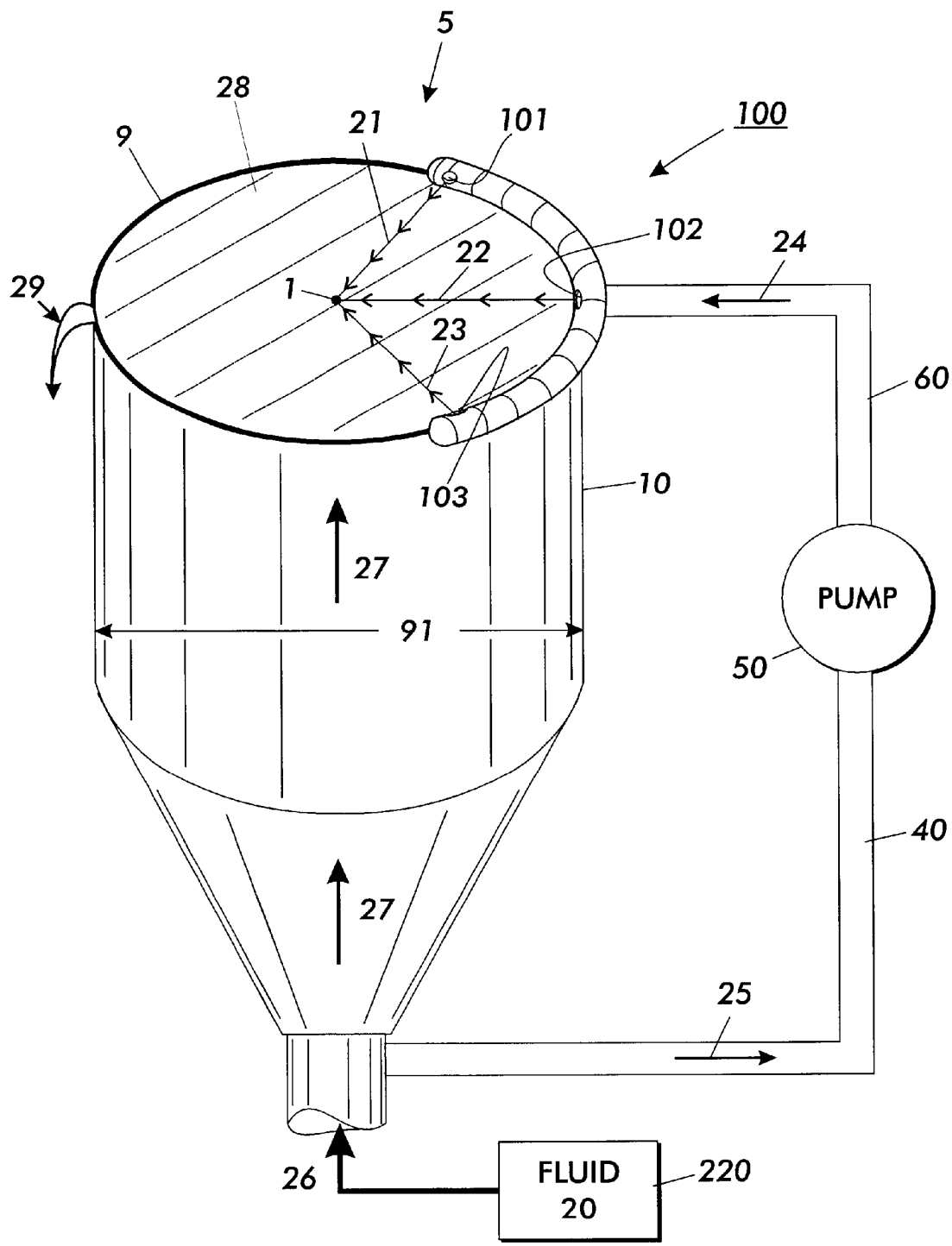
FIG. 1 shows a tank 10 defining a tank orifice 5 comprising a tank orifice rim 9, the tank orifice rim 9 containing a fluid surface 28 of a fluid 20, the fluid 20 overflowing the tank orifice rim 9 to form a fluid overflow 29. As shown, the tank 10 is arranged with one embodiment of an apparatus 100 for removing matter on a fluid surface 28 of a tank 10.

Referring now to FIG. 1 there is shown a tank 10 defining a tank orifice 5 comprising a tank orifice rim 9, the tank orifice rim 9 containing a fluid surface 28 of a fluid 20, the fluid 20 overflowing the tank orifice rim 9 to form a fluid overflow 29, the fluid surface 28 defining a fluid surface center 1. As depicted, a fluid source 220 supplies the fluid 20 which flows 26 and 27 through the hollow of tank 10 to ultimately form the fluid surface 28 and the fluid overflow 29.

In one embodiment, the fluid tank overflow 29 is from 0.1 to 0.3 gallon per minute.

In another embodiment, the tank orifice rim 9 defines a tank orifice rim diameter 91 from 25 mm to 250 mm.

Still referring to FIG. 1, the tank 10 is arranged with one embodiment of an apparatus 100 for removing matter on the fluid surface 28. As shown, the depicted embodiment 100 comprises means for discharging a first jet 21, a second jet 22 and a third jet 23 of the fluid 20 towards the fluid surface center 1.

As shown, the fluid source 220 supplies the fluid 20 which thereafter flows 25 by means of a first suitable supply pipe 40 to a positive displacement pump 50. The pump 50, in turn, causes the fluid 20 to flow 24 by means of a second suitable supply pipe 60 to the depicted embodiment of the apparatus 100 and ultimately to the first jet 21, the second jet 22 and the third jet 23.

In one embodiment, the pump 50 comprises a Zenith B-9000 series gear pump, available from Zenith Products whose web address is www.zenithproducts.com.

In another embodiment, the pump 50 causes the fluid 20 to flow 24 at a flow rate from 0.05 to 0.3 gallon per minute to supply the first jet 21, the second jet 22 and the third jet 23.

In a further embodiment, the tank 10 comprises a dip tank.

In a still further embodiment, the fluid 20 comprises photoreceptor coating solution or components thereof such as organic solvents, additives, or both.

Figure 2:
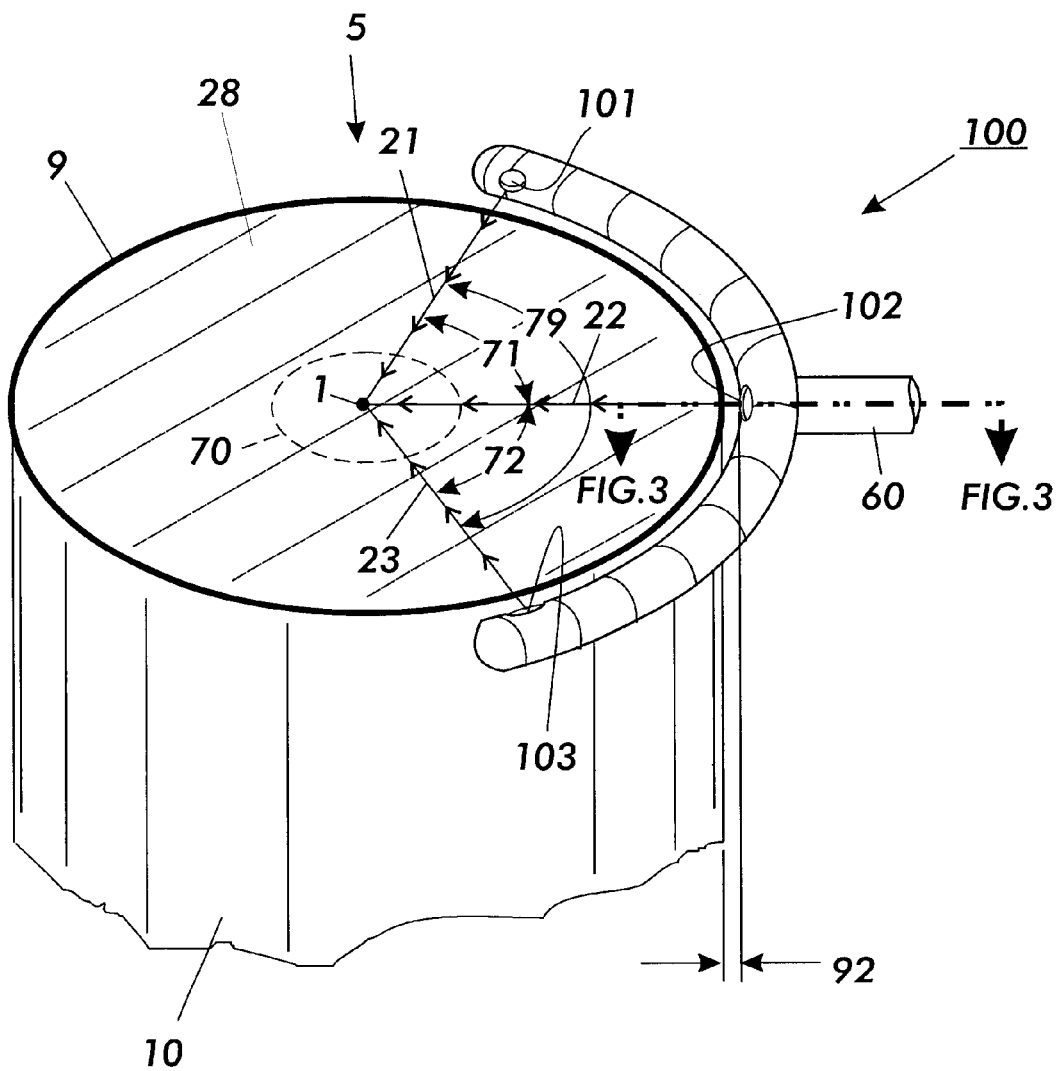
FIG. 2 shows greater detail of the FIG. 1-depicted embodiment of the apparatus 100 comprising a first nozzle 101, second nozzle 102 and third nozzle 103 arranged for respectively discharging a first jet 21, a second jet 22 and a third jet 23 of the fluid 20 towards the fluid surface center 1.

Referring now to FIG. 2, there is shown greater detail of the FIG. 1-depicted embodiment of the apparatus 100. As depicted, the apparatus 100 comprises a first nozzle 101, a second nozzle 102 and a third nozzle 103 arranged for respectively discharging the first jet 21, the second jet 22 and the third jet 23 of the fluid 20 towards the fluid surface center 1. As shown, the first jet 21 and the second jet 22 respectively form a first angle 71. Also, the second jet 22 and the third jet 23 respectively form a second angle 72.

In one embodiment, each of the first angle 71 and the second angle 72 are equal to or greater than five degrees.

In another embodiment, the first angle 71 and the second angle 72 comprise a depicted total angle 79 not exceeding one hundred eighty degrees, or π radians.

Still referring to FIG. 2, in a still further embodiment, each of the first jet 21, the second jet 22 and the third jet 23 impinges a depicted target area 70 of the fluid surface 28. As shown, the target area 70 comprises a circular area within a target distance or radius of the fluid surface center 1. In one embodiment, the target radius is 5 mm.

Figure 3:
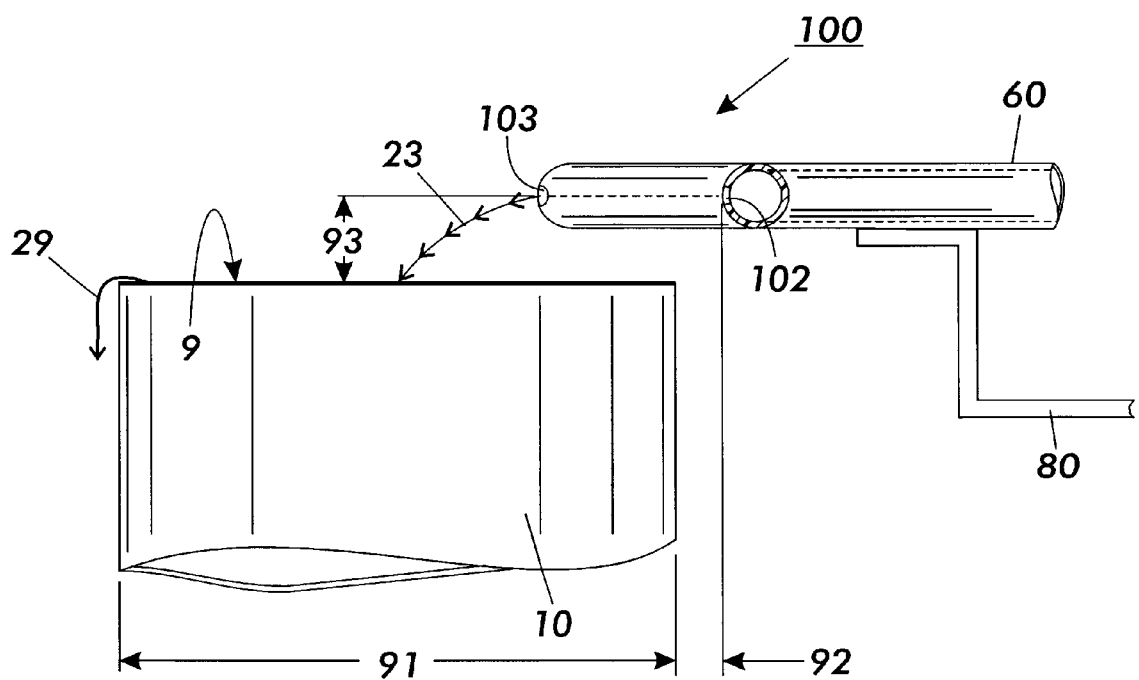
FIG. 3 is a cross-sectional view of the FIG. 1-depicted embodiment of the apparatus 100. The FIG. 3 cross-sectional view is based on the FIG. 2 reference line designated 3–3'.

Referring now to FIG. 3, there is shown a cross-sectional view of the FIG. 1-depicted embodiment of the apparatus 100 coupled to a supporting means 80. With momentary reference back to FIG. 2, the cross-sectional view depicted in FIG. 3 is based on the FIG. 2 reference line designated 3—3'.

Still referring to FIG. 3, in one embodiment, the depicted supporting means 80 comprises a suitable mounting bracket. Referring now generally to the foregoing described embodiments of the apparatus 100 that are depicted in FIGS. 2–3, it is seen that each nozzle of the first nozzle 101, the second nozzle 102 and the third nozzle 103 is arranged to be positioned a fixed radial separation distance 92 from the tank orifice rim 9 for respectively supplying the first jet 21, the second jet 22 and the third jet 23. In one embodiment, for example, the fixed radial separation distance 92 is adjustable from nil to 100 mm.

Also, as shown in FIG. 3, each nozzle of the first nozzle 101, the second nozzle 102 and the third nozzle 103 is further arranged to be positioned a fixed vertical separation distance 93 above the tank orifice rim 9. In a further embodiment, for example, the fixed vertical separation distance 93 is adjustable from nil to 100 mm.

Also depicted in FIG. 3 is the tank orifice rim 9 and the tank orifice rim diameter 91.

Figure 4:
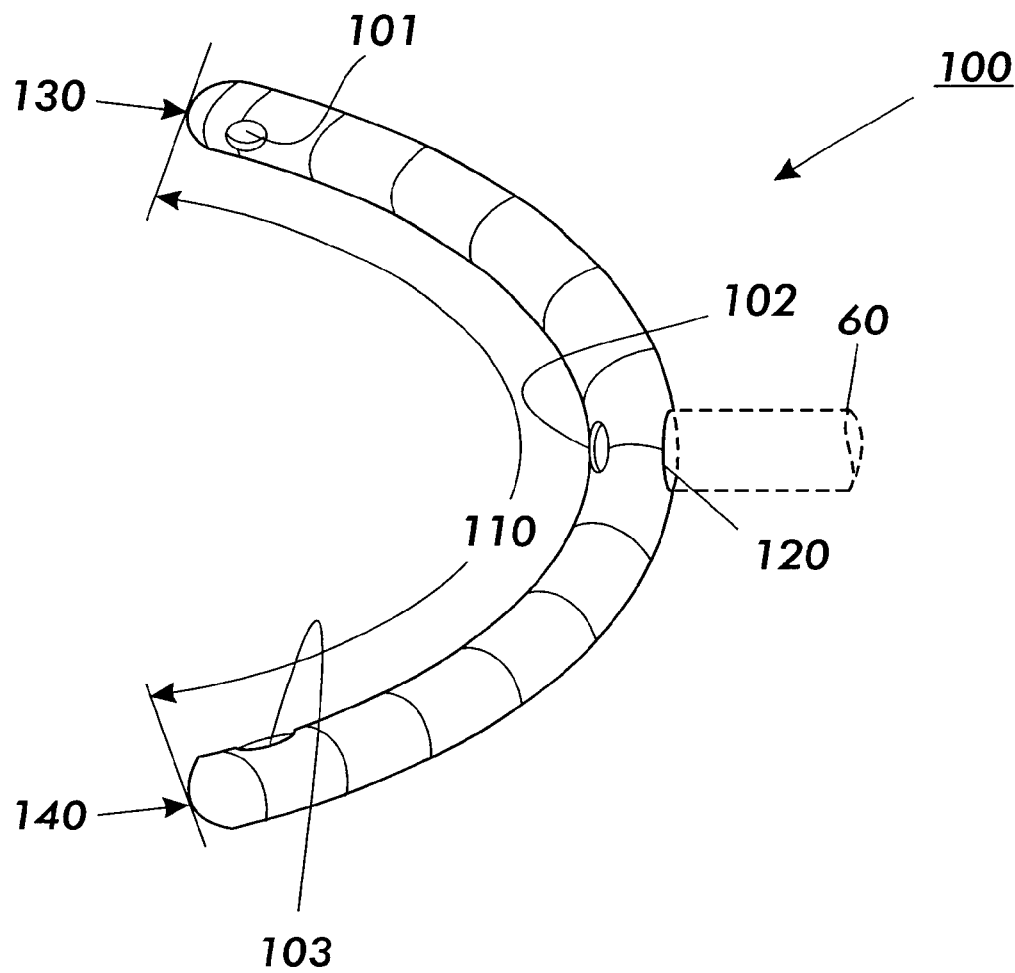
FIG. 4 is another view of the FIG. 1-depicted embodiment of the apparatus 100.

Referring now to FIG. 4, with cross-reference to FIG. 1, there is shown an another view of the FIG. 1-depicted embodiment of the apparatus 100 coupled to the fluid source 60 (shown in broken lines) by means of a depicted suitable junction 120. As shown, the depicted embodiment of the apparatus 100 comprises a length of hollow piping material 110 that is shaped based on the shape of the proximately-located portion of the tank orifice rim 9.

Momentarily referring back to FIG. 3, it will be understood that in one embodiment, for example, the depicted tank orifice rim 9 forms a circle with a tank orifice rim diameter 91 of 200 mm, corresponding to a curved arc of 100 mm radius, and the depicted fixed radial separation distance 92 is 10 mm.

Returning now to FIG. 4, it will be understood that in this example the depicted length of hollow piping material 110 is shaped based on the shape of the corresponding tank orifice rim 9. As a result, the length of hollow piping material 110 forms a curved arc whose radius is 100 mm (the tank orifice rim 9 radius value) plus 10 mm (the fixed radial separation 92 value), for a total radius of 110 mm.

In one embodiment, the piping material is comprised of copper.

In another embodiment, the piping material is comprised of plastic.

In a further embodiment, the piping material is comprised of stainless steel.

In a still further embodiment, the piping material comprised of inorganic ceramics.

In yet another embodiment, the piping material comprised of polymeric material.

In yet a still further embodiment, the piping material comprises a 0.25 inch inner diameter and a 0.035 inch wall.

Referring still to FIG. 4, in one embodiment, suitable end caps 130 and 140 are used to seal the ends of the hollow piping material 110. In another embodiment, each of the first nozzle 101, the second nozzle 102 and the third nozzle 103 forms an orifice of from 0.06 to 0.22 inches in diameter.

Figure 5:
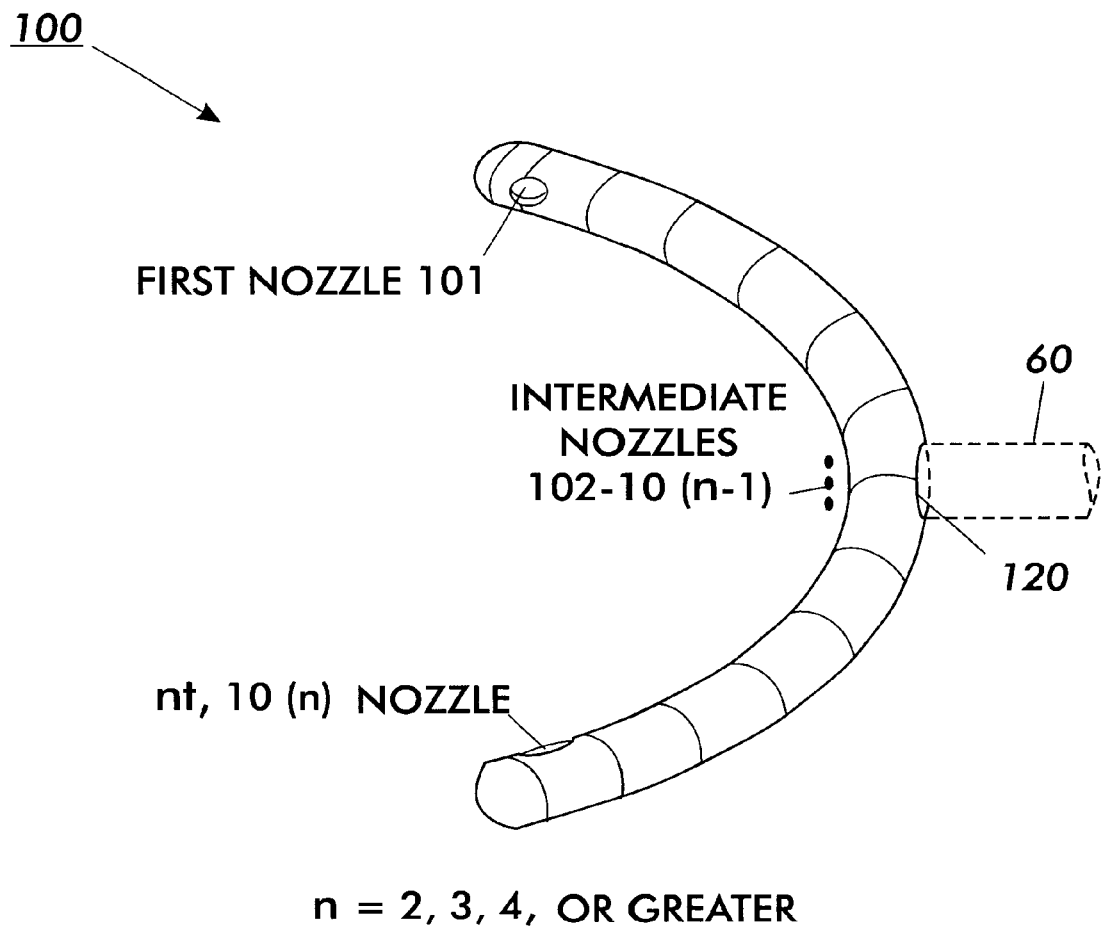
FIG. 5 shows another embodiment of an apparatus 100 for removing matter on a fluid surface 28 of a tank 10, the apparatus 100 comprising means for discharging a plurality (n) of jets of the fluid towards the fluid surface center, wherein n is 2 or greater.

In a further embodiment, each orifice of the first nozzle 101, the second nozzle 102 and the third nozzle 103 is formed by drilling holes in the wall of the piping material 110. Referring now to FIG. 5, there is shown another embodiment of an apparatus 100 for removing matter on a fluid surface of a tank comprising means for discharging a plurality (n) of jets of the fluid towards the fluid surface center, wherein n is 2 or greater. Thus, still referring to FIG. 5, it will be understood that n equals 2, 3, 4 or greater.

Still referring to FIG. 5, it will be understood that, in comparison, the foregoing FIGS. 1–4 depict various embodiments of the FIG. 5-depicted apparatus 100 wherein n equals 3.

Figure 6:
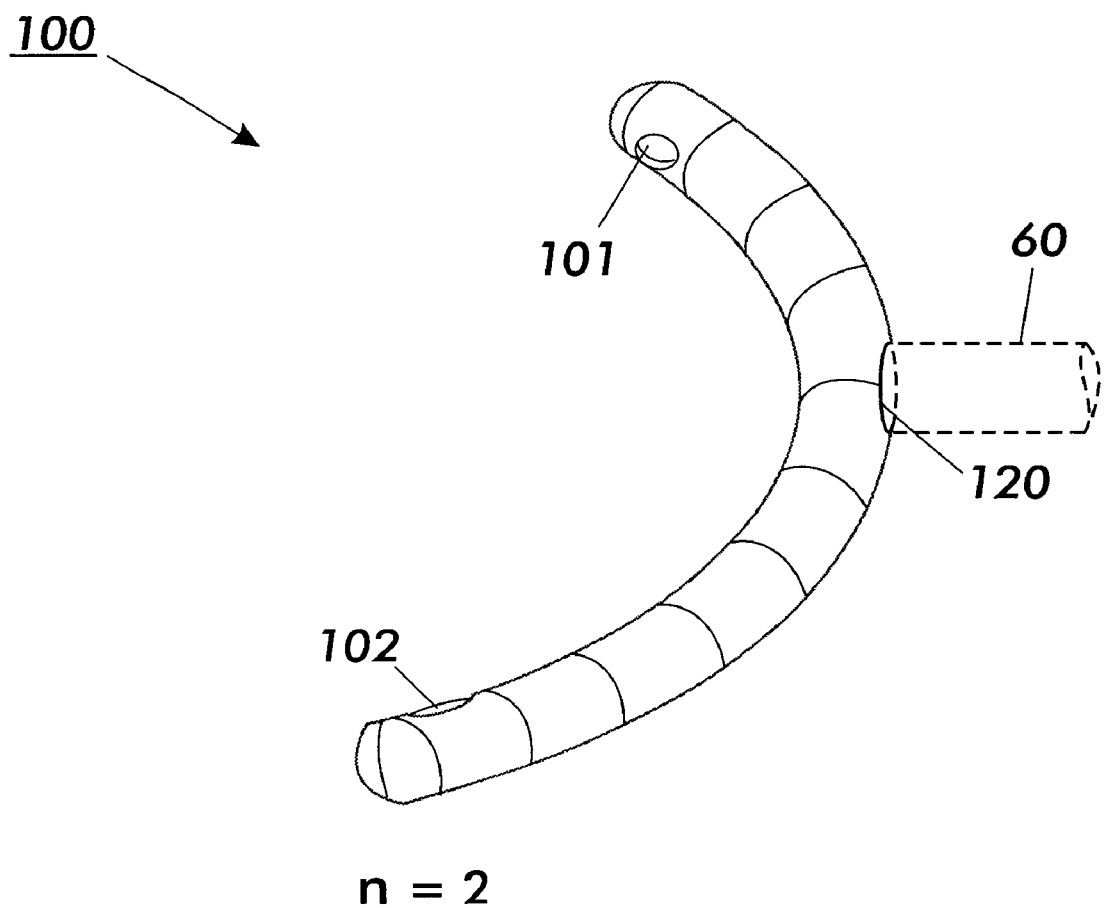
FIG. 6 shows a further embodiment of the FIG. 5-depicted embodiment of the apparatus 100, wherein n equals 2.

Still referring to FIG. 5, the depicted embodiment of the apparatus 100 comprises a plurality (n) of nozzles, where n equals 2, 3, 4 or greater, with each nozzle supplying a corresponding jet of the fluid. Assuming that the "n" nozzles are depicted by reference numbers 101 through 10n, the initial or first nozzle is depicted by reference number 101, the intermediate nozzles are depicted by reference numbers 102 through 10(n−1), and the last or "nth" nozzle is depicted by the reference number 10(n). Referring to FIG. 6, there is shown a further embodiment of the FIG. 5-depicted embodiment of an apparatus 100 for removing matter on a fluid surface of a tank, wherein n equals 2.

Figure 7:
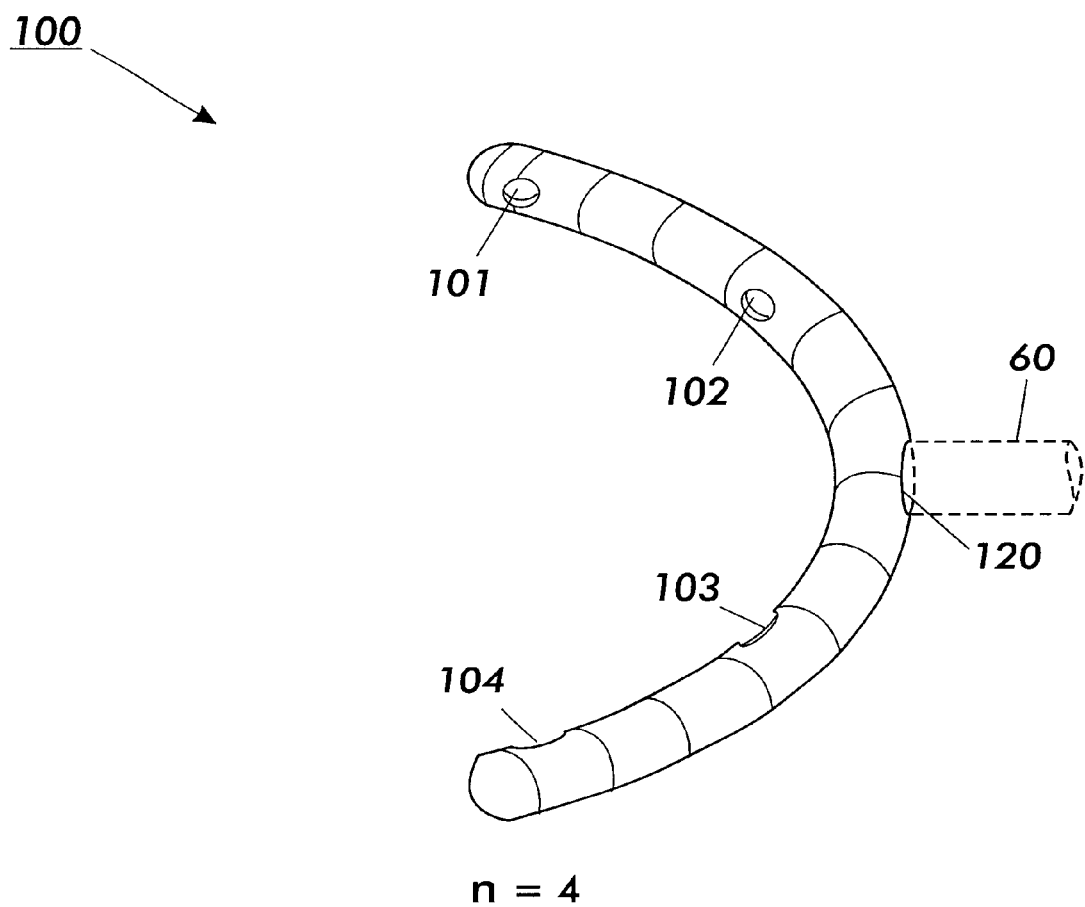
FIG. 7 shows a still further embodiment of the FIG. 5-depicted embodiment of the apparatus 100, wherein n equals 4.

Referring now to FIG. 7, there is shown a still further embodiment of the FIG. 5-depicted embodiment of an apparatus 100 for removing matter on a fluid surface of a tank, wherein n equals 4.

In summary, there is depicted in FIGS. 1–4 and described in connection therewith one embodiment of a method for removing matter on a fluid surface 28 of a tank 10, the tank 10 defining a tank orifice 5 comprising a tank orifice rim 9, the tank orifice rim 9 containing a fluid surface 28 of a fluid 20, the fluid 20 overflowing the tank orifice rim 9 to form a fluid overflow 29, the fluid surface 28 defining a fluid surface center 1, the method comprising discharging a first jet 21, a second jet 22 and a third jet 23 of the fluid 20 towards the fluid surface center 1.

Also, there is depicted in FIGS. 5–7 and described in connection therewith another embodiment of a method for removing matter on a fluid surface 28 of a tank 10, the tank 10 defining a tank orifice 5 comprising a tank orifice rim 9, the tank orifice rim 9 containing a fluid surface 28 of a fluid 20, the fluid 20 overflowing the tank orifice rim 9 to form a fluid overflow 29, the fluid surface 28 defining a fluid surface center 1, the method comprising discharging a plurality (n) of jets of the fluid 20 towards the fluid surface center 1.

Also, there is depicted in FIGS. 1–4 and described in connection therewith one embodiment of an apparatus 100 for removing matter on a fluid surface 28 of a tank 10, the tank 10 defining a tank orifice 5 comprising a tank orifice rim 9, the tank orifice rim 9 containing a fluid surface 28 of a fluid 20, the fluid 20 overflowing the tank orifice rim 9 to form a fluid overflow 29, the fluid surface 28 defining a fluid surface center 1, the apparatus 100 comprising means for discharging a first jet 21, a second jet 22 and a third jet 23 of the fluid 20 towards the fluid surface center 1.

Also, there is depicted in FIGS. 5–7 and described in connection therewith another embodiment of an apparatus 100 for removing matter on a fluid surface 28 of a tank 10, the tank 10 defining a tank orifice 5 comprising a tank orifice rim 9, the tank orifice rim 9 containing a fluid surface 28 of a fluid 20, the fluid 20 overflowing the tank orifice rim 9 to form a fluid overflow 29, the fluid surface 28 defining a fluid surface center 1, the apparatus 100 comprising means for discharging a plurality (n) of jets of the fluid 20 towards the fluid surface center 1.

By way of example, in a dip coating application the apparatus 100 provides a dip coating skimmer that removes any foreign materials such as bubbles and particles that remain on the fluid surface 28 of the dip tank 10. The apparatus 100 applies the multiple coating solution streams or jets 21–23 asymmetrically on the fluid surface 28. The momentum of the jets 21–23 provides additional force to the overflow 29 to remove any foreign materials. Typical dip tanks provide coating solution flow that is symmetric for flow and thickness uniformity. However, such symmetry is undesirable in order to remove entrained foreign materials that may be trapped in the vicinity of the fluid surface center 1 by operation of vertices. Also, bubbles caused by dipping photoreceptor substrates in the dip tank 10 also tend to adhere to the substrate surface. In contrast, the described apparatus 100 provides asymmetrical coating solution flow to ensure that the trapped foreign materials are driven towards the tank orifice rim and ultimately carried by the fluid overflow 29 to the outside of the dip tank 10.

A typical dip coating operation cycle is now described wherein the substrate to be coated comprises a photoreceptor drum. After a photoreceptor drum has been coated in the dip tank 10, the pump 50 starts to pump solution 20 into the pipeline 60 and spray by the jets 21, 22 and 23 onto the surface 28 of the solution 20 in the dip tank 10 to remove any foreign materials there. The pump 50 stops when a new photoreceptor drum is dipped into the tank 10 to avoid any coating solution getting inside the hollow of the drum. After the bottom of the photoreceptor drum is inside the coating solution, the pump 50 starts again to remove any entrained air bubbles by insertion. The pump 50 stops once the insertion of piping nearly completes. The pump starts again after the photoreceptor drum is over the coating solution.

As a result of the apparatus and method for removing matter on a fluid surface of a tank, in accordance with the present invention, there is improved quality and yield in a typical dip coating process, as well as reduced dip coating process "down time".

In another application, the apparatus and method for removing matter on a fluid surface of a tank, in accordance with the present invention, is used in substrate cleaning and other processes.

While various embodiments of an apparatus and method for removing matter on a fluid surface of a tank, in accordance with the present invention, have been described hereinabove, the scope of the invention is defined by the following claims.

What is claimed is:

1. A method for removing matter on a fluid surface of a tank, the tank defining a tank orifice comprising a tank orifice rim, the tank orifice rim containing a fluid surface of a fluid, the fluid overflowing the tank orifice rim to form a fluid overflow, the fluid surface defining a fluid surface center, the method comprising discharging a first jet, a second jet and a third jet of the fluid towards the fluid surface center.

2. The method of claim 1, the first jet and the second jet respectively forming a first angle, and the second jet and the third jet respectively forming a second angle.

3. The method of claim 2, each of the first angle and the second angle being equal to or greater than five degrees.

4. The method of claim 2, the first angle and the second angle comprising a total angle not exceeding one hundred eighty degrees.

5. The method of claim 1, the first jet, the second jet and the third jet respectively supplied by a corresponding first nozzle, second nozzle and third nozzle.

6. The method of claim 5, each nozzle of the first nozzle, second nozzle and third nozzle positioned a fixed radial distance from the tank orifice rim.

7. The method of claim 5, the first nozzle, second nozzle and third nozzle each further positioned a fixed vertical separation distance above the tank orifice rim.

8. The method of claim 1, the tank comprising a dip tank, the fluid comprising photoreceptor coating solution or components thereof such as solvents, additives, or both.

9. An apparatus for removing matter on a fluid surface of a tank, the tank defining a tank orifice comprising a tank orifice rim, the tank orifice rim containing a fluid surface of a fluid, the fluid overflowing the tank orifice rim to form a fluid overflow, the fluid surface defining a fluid surface center, the apparatus comprising means for discharging a first jet, a second jet and a third jet of the fluid towards the fluid surface center.

10. The apparatus of claim 9, the first jet and the second jet respectively forming a first angle, and the second jet and the third jet respectively forming a second angle.

11. The apparatus of claim 10, each of the first angle and the second angle being equal to or greater than five degrees.

12. The apparatus of claim 10, the first angle and the second angle comprising a total angle not exceeding one hundred eighty degrees.

13. The apparatus of claim 9, the apparatus comprising a first nozzle, second nozzle, and third nozzle for respectively supplying the first jet, the second jet and the third jet.

14. The apparatus of claim 13, each of the first nozzle, second nozzle and third nozzle arranged to be positioned a fixed radial separation distance from the tank orifice rim.

15. The apparatus of claim 13, each of the first nozzle, second nozzle and third nozzle further arranged to be positioned a fixed vertical separation distance above the tank orifice rim.

16. The apparatus of claim 9, comprising a length of hollow piping material that is shaped based on the shape of the tank orifice rim.

17. The apparatus of claim 16, the piping material comprised of copper.

18. The apparatus of claim 16, the piping material comprised of plastic.

19. The apparatus of claim 16, the piping material comprised of stainless steel.

20. The apparatus of claim 16, the piping material comprised of inorganic ceramics.

21. The apparatus of claim 16, the piping material comprised of polymeric material.

22. A method for removing matter on a fluid surface of a tank, the tank defining a tank orifice comprising a tank orifice rim, the tank orifice rim containing a fluid surface of a fluid, the fluid overflowing the tank orifice rim to form a fluid overflow, the fluid surface defining a fluid surface center, the method comprising discharging a plurality (n) of jets of the fluid towards the fluid surface center.

23. The method of claim 22, wherein n equals 2.

24. The method of claim 22, wherein n equals 4.

25. The method of claim 22, wherein n is greater than 4.

26. An apparatus for removing matter on a fluid surface of a tank, the tank defining a tank orifice comprising a tank orifice rim, the tank orifice rim containing a fluid surface of a fluid, the fluid overflowing the tank orifice rim to form a fluid overflow, the fluid surface defining a fluid surface center, the apparatus comprising means for discharging a plurality (n) of jets of the fluid towards the fluid surface center.

27. The apparatus of claim 26, wherein n equals 2.

28. The apparatus of claim 26, wherein n equals 4.

29. The apparatus of claim 26, wherein n is greater than 4.

30. The apparatus of claim 26, the tank comprising a dip tank, the fluid comprising photoreceptor coating solution or components thereof such as solvents, additives, or both.

* * * * *